United States Patent
Jeong et al.

(10) Patent No.: US 11,125,455 B2
(45) Date of Patent: Sep. 21, 2021

(54) DEHUMIDIFICATION/EVAPORATIVE COOLING-BASED 100% OUTDOOR AIR CONDITIONING SYSTEM AND CONTROLLING METHOD

(71) Applicant: IUCF-HYU (INDUSTRY-UNIVERSITY COOPERATION FOUNDATION HANYANG UNIVERSITY), Seoul (KR)

(72) Inventors: Jae Weon Jeong, Seoul (KR); Joon Young Park, Gwangju-si (KR); Sung Joon Lee, Suwon-si (KR); Dong Seob Yoon, Hwaseong-si (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 130 days.

(21) Appl. No.: 16/468,967

(22) PCT Filed: Dec. 26, 2017

(86) PCT No.: PCT/KR2017/015505
§ 371 (c)(1),
(2) Date: Jun. 12, 2019

(87) PCT Pub. No.: WO2018/124709
PCT Pub. Date: Jul. 5, 2018

(65) Prior Publication Data
US 2020/0018500 A1    Jan. 16, 2020

(30) Foreign Application Priority Data

Dec. 28, 2016 (KR) .......................... 10-2016-0180665

(51) Int. Cl.
*F24F 11/30* (2018.01)
*F24F 3/14* (2006.01)
(Continued)

(52) U.S. Cl.
CPC ............... *F24F 11/30* (2018.01); *F24F 3/14* (2013.01); *F24F 5/0003* (2013.01);
(Continued)

(58) Field of Classification Search
CPC .............. F24F 11/30; F24F 11/0001; F24F 2011/0002; F24F 2011/0006; F24F 13/10;
(Continued)

(56) References Cited

U.S. PATENT DOCUMENTS

2011/0168793 A1* 7/2011 Kreft ................... F24F 11/0001
236/44 C

FOREIGN PATENT DOCUMENTS

JP    2014-149118 A    8/2014
JP    2014149118 A  *  8/2014
(Continued)

OTHER PUBLICATIONS

Communication dated Sep. 15, 2020, from the Japanese Patent Office in Application No. 2019-530126.
(Continued)

*Primary Examiner* — Eric S Ruppert
(74) *Attorney, Agent, or Firm* — Sughrue Mion, PLLC

(57) ABSTRACT

A dehumidification•evaporation cooling-based all-fresh-air air conditioning system according to one embodiment of the present invention may provide, a dehumidification•evaporation cooling-based all-fresh-air air conditioning system changes a humidity, temperature and enthalpy of an external air which is provided from an external air inlet, to provide a changed first air to an air
(Continued)

conditioning space or discharge a second air stayed in the air conditioning space from the air conditioning space to an outlet, the dehumidification•evaporation-based all-fresh-air air conditioning system comprising, a piping module configured to provide a transfer passage of the external air, the first air and the second air, a humidity control unit configured to controls the humidity of the external air, wherein the humidity control unit located on the piping module, a temperature control unit configured to control temperature, humidity and enthalpy of supplied air to be the first air, wherein the temperature control unit located on the piping module, a path setting unit configured to change a transfer path of the external air, the first air and the second air, wherein the path setting unit located on the piping module and a control unit which decides the transfer path of the air from the external air inlet to the air conditioning space or the air conditioning space to the outlet, and controls the path setting unit for transferring air to the decided transfer path based on a first information related to a humidity, a temperature and an enthalpy of the external air.

17 Claims, 12 Drawing Sheets

(51) Int. Cl.
  *F24F 5/00* (2006.01)
  *F24F 11/00* (2018.01)

(52) U.S. Cl.
  CPC ........ *F24F 5/0035* (2013.01); *F24F 11/0001* (2013.01); *F24F 11/0008* (2013.01); *F24F 2003/1446* (2013.01); *F24F 2011/0002* (2013.01)

(58) Field of Classification Search
  CPC ........ F24F 2110/10; F24F 13/12; F24F 13/20; F24F 13/22
  See application file for complete search history.

(56) References Cited

FOREIGN PATENT DOCUMENTS

| KR | 10-1525609 B1 | 6/2015 |
| KR | 10-1525610 B1 | 6/2015 |
| KR | 10-2016-0037028 A | 4/2016 |
| KR | 10-2016-0092567 A | 8/2016 |

OTHER PUBLICATIONS

Korean Office Action issued in KR 10-2016-0180665 dated Apr. 6, 2018.
Korean Notice of Allowance issued in KR 10-2016-0180665 dated Oct. 17, 2018.
International Search Report of PCT/KR2017/015505 dated Apr. 26, 2018.

* cited by examiner (a)

(b)

(a)

(b)

DEHUMIDIFICATION/EVAPORATIVE COOLING-BASED 100% OUTDOOR AIR CONDITIONING SYSTEM AND CONTROLLING METHOD

TECHNICAL FIELD

The present invention relates to a dehumidification and evaporation cooling-based all-fresh-air air conditioning system and a method of controlling the same, and more particularly, to a dehumidification and evaporation cooling-based all-fresh-air air conditioning system for adjusting dehumidification and cooling of external air according to season-specific external air conditions and supplying preset air to an air conditioning space and a method of controlling the system.

BACKGROUND ART

According to the Bali Road Map adopted in December 2007 at the 13th Conference of Parties (COP) of United Nations (UN) Climate Change Conference, Korea which is the ninth largest emitter of greenhouse gases had to set a nationwide amount of greenhouse gases to be reduced in 2009 and actually began the reduction from 2013. Accordingly, in almost all industrial fields, people are devoting themselves to develop and practically use technologies for saving energy and reducing carbon emission. In particular, in the field of architecture which occupies 30% or more of the total energy consumption of Korea, efforts are being made to develop a high-efficient and high-performance system for remarkably reducing the amount of greenhouse gas emission in the field of architecture by sharply reducing energy consumed for ventilation, cooling, and heating.

As a part of such efforts, recently, several developed countries of North America and Europe are actively conducting research for a non-polluting cooling system which provides air conditioning using only latent heat of vaporization of water. Along with this, eco-friendly cooling systems which simultaneously aim at environmental conservation and energy saving using evaporative cooling are recently attracting attention in Korea.

Cooling systems using latent heat of vaporization of water have been considered as systems that can be used only in Europe where the external air has a high temperature but a relative low humidity in the summer or a dry climate.

However, it was disclosed that when an indirect evaporative cooling in which air of an air supply side does not come in direct contact with water sprayed for evaporative cooling is used, economical cooling effects can be obtained even in a region in which it is hot and humid in summer, such as Korea, (Maheshwari et al. 2001; Gasparella et al. 2003; Jeong Youngho 2008). Accordingly, cooling systems using evaporative cooling are newly attracting attention.

Also, when a dehumidification rotor and the like is additionally used in combination (Zhang et al. 2005; Jang Youngsoo et al. 2004), improved cooling effects are obtained, and carbon emission is reduced through a reduction in energy consumption. Additionally, due to the excellent eco-friendly characteristic that water which gives no worry about environmental destruction unlike existing refrigerants is used, research and development on cooling systems using latent heat of vaporization will be further encouraged in the future.

However, in most evaporative cooling systems which have been developed on the basis of research so far as described above, a temperature of supplied air is determined within a range of 23° C. to 26° C. in summer. Therefore, unless the amount of supplied air is very large, it is difficult to expect sufficient cooling effects in general buildings. Due to this limitation, evaporative cooling systems are being developed merely as outdoor air handling units which supply only the minimum amount of ventilation air required to maintain pleasant indoor air quality at a neutral temperature close to an indoor temperature or small air conditioners which can be used when an indoor sensible-heat load is not large. To overcome the above drawback, research is being carried out on a dehumidification and evaporation cooling system which is combined with a dehumidification rotor to improve evaporative cooling effects, but a wide range of empirical study is required to make system performance implementable and practical.

Meanwhile, mainly in developed countries, active research is being carried out on a 100% outdoor air system which adjusts an indoor environment with only 100% external air to improve indoor air quality. This results from serious problems related to air quality, such as sick building syndrome or cross contamination which is caused when existing air conditioning systems recirculate 70% or more of contaminated indoor air to the interior for energy saving. In other words, there are increasing expectations for 100% outdoor air systems because the technology ensures pleasant and healthy indoor air quality by exhausting all contaminated indoor air to the outside and performing air conditioning with fresh external air only. However, hitherto proposed air conditioning methods using an evaporative cooling system deviate from the international trend of 100% outdoor air system development and are still based on indoor air recirculation like existing air conditioning systems. Therefore, there is a fundamental problem in that it is difficult to expect a notable improvement in an indoor air environment.

As a part of efforts to solve these existing problems, the inventor of the present invention proposed an air conditioning method using a 100% outdoor air system in Korean Unexamined Patent Application No. 10-2010-0028820 (filed on Mar. 30, 2010) (Patent Publication No. 10-2011-0109209 (Oct. 6, 2011)) and Korean Unexamined Patent Application No. 10-2010-0028814 (filed on Mar. 30, 2010) (Patent Publication No. 10-2011-0109204 (Oct. 6, 2011)).

However, even such an air conditioning method of an air conditioning system has a problem in that it is difficult to save energy because efficiency of an indirect evaporative cooler and a direct evaporative cooler is remarkably lowered when cooling is performed with external air in a hot and humid environment (particularly in summer).

DISCLOSURE

Technical Problem

To solve the above conventional problems, the present invention is proposed by further improving the air conditioning method previously filed as a patent application by the present inventor. The present invention is directed to providing a dehumidification and evaporation cooling-based all-fresh-air air conditioning system which can remarkably improve efficiency of an indirect evaporative cooler and a direct evaporative cooler by having a structure for improving efficiency on an air supply side, to which external air is supplied, even when the external air is used in a hot and humid environment, such as summer, and can maximize energy saving effects accordingly, and a method of controlling the system.

Objectives of the present invention are not limited to those mentioned above, and other objectives which have not been mentioned will be clearly understood by those of ordinary skill in the art from the following description.

Technical Solution

A dehumidification•evaporation cooling-based all-fresh-air air conditioning system according to one embodiment of the present invention may provide, a dehumidification•evaporation cooling-based all-fresh-air air conditioning system changes a humidity, temperature and enthalpy of an external air which is provided from an external air inlet, to provide a changed first air to an air conditioning space or discharge a second air stayed in the air conditioning space from the air conditioning space to an outlet, the dehumidification•evaporation-based all-fresh-air air conditioning system comprising, a piping module configured to provide a transfer passage of the external air, the first air and the second air, a humidity control unit configured to controls the humidity of the external air, wherein the humidity control unit located on the piping module, a temperature control unit configured to control temperature, humidity and enthalpy of supplied air to be the first air, wherein the temperature control unit located on the piping module, a path setting unit configured to change a transfer path of the external air, the first air and the second air, wherein the path setting unit located on the piping module and a control unit which decides the transfer path of the air from the external air inlet to the air conditioning space or the air conditioning space to the outlet, and controls the path setting unit for transferring air to the decided transfer path based on a first information related to a humidity, a temperature and an enthalpy of the external air.

A dehumidification•evaporation cooling-based all-fresh-air air conditioning system according to one embodiment of the present invention may provide, wherein the first information includes information on a first humidity, a first temperature and a first enthalpy of the external air, wherein the third information includes information of a third temperature, a third humidity and a third enthalpy, wherein the control unit configured to compare a second information on a second humidity, a second temperature and a second enthalpy of the first air with the first information, and the control unit controls the path setting unit, and wherein the control unit calculate a third information by comparing the first information and the second information for controlling the path setting unit, and the control unit controls the path setting unit based on the calculated third information.

A dehumidification•evaporation cooling-based all-fresh-air air conditioning system according to one embodiment of the present invention may provide, wherein the temperature control unit comprising, an indirect evaporative cooling unit configured to sensible heat cool supplied air and a direct evaporative cooling unit configured to cool and humidify supplied air.

A dehumidification•evaporation cooling-based all-fresh-air air conditioning system according to one embodiment of the present invention may provide, wherein the control unit sets the third temperature equal to the second temperature when the first temperature is higher than the second temperature, and sets the third temperature higher than the second temperature when the first temperature is higher than the second temperature, and wherein the control unit sets the third enthalpy by value calculated from the third temperature and the third humidity.

A dehumidification•evaporation cooling-based all-fresh-air air conditioning system according to one embodiment of the present invention may provide, the piping module comprising an air supply pipe which is transfer passage of the external air and the first air, and exhaust pipe which is transfer passage of the second air, the outlet comprising a first outlet and a second outlet, the path setting unit comprising, a first damper unit which is installed on an air supply pipe, between the external air inlet and the humidity control unit, decides air can be transferred from the external air inlet to the humidity control unit whether the first damper unit is opened or closed, a second damper unit which is installed on an air supply pipe, between the external air inlet and the temperature control unit, decides air can be transferred from the external air inlet to the temperature control unit whether the second damper unit is opened or closed, a third damper unit which is installed on an air supply pipe positioned on an entrance of the indirect evaporative cooling unit, decides air can be transferred to the indirect evaporative cooling unit whether the third damper unit is opened or closed, a fourth damper unit which is installed on an air supply pipe positioned on an entrance of the direct evaporative cooling unit, decides air can be transferred to the direct evaporative cooling unit whether the fourth damper unit is opened or closed, a fifth damper unit which is installed on an air supply pipe, between the second damper unit and the fourth damper unit, decides air can be transferred from the second damper unit to the fourth damper unit whether the fifth damper unit is opened or closed, a sixth damper unit which is installed on an air supply pipe, between the fifth damper unit and the air conditioning space, decides air can be transferred from the fifth damper unit to the air conditioning space whether the sixth damper unit is opened or closed, and a seventh damper unit which is installed on an exhaust pipe, between the air conditioning space and the first outlet, decides air can be transferred from the air supply space to the first outlet whether the seventh damper unit is opened or closed.

A dehumidification•evaporation cooling-based all-fresh-air air conditioning system according to one embodiment of the present invention may provide, wherein the control unit controls the path setting unit, and the external air passes only the indirect evaporative cooling unit, when the first temperature is lower than the third temperature, wherein the control unit controls the path setting unit to close the first damper unit, open the second damper unit, open the third damper unit, close the fourth unit, close the fifth damper unit, open the sixth damper unit, open the seventh damper unit.

A dehumidification•evaporation cooling-based all-fresh-air air conditioning system according to one embodiment of the present invention may provide, wherein the control unit controls the path setting unit, and the external air passes only the direct evaporative cooling unit, when the first temperature is higher than the third temperature and the first enthalpy is smaller than the third enthalpy, wherein the control unit controls the path setting unit to close the first damper unit, open the second damper unit, close the third damper unit, open the fourth unit, open the fifth damper unit, close the sixth damper unit, close the seventh damper unit.

A dehumidification•evaporation cooling-based all-fresh-air air conditioning system according to one embodiment of the present invention may provide, wherein the control unit controls the path setting unit, and the external air passes only the indirect evaporative cooling unit and the direct evaporative cooling unit, when the first temperature is higher than the third temperature, the first enthalpy is greater than the third enthalpy and the first humidity is smaller than the second humidity, wherein the control unit controls the path setting unit to close the first damper unit, open the second damper unit, open the third damper unit, open the fourth unit, close the fifth damper unit, close the sixth damper unit, open the seventh damper unit.

A dehumidification•evaporation cooling-based all-fresh-air air conditioning system according to one embodiment of the present invention may provide, wherein the control unit controls the path setting unit, and the external air passes the humidity control unit, the indirect evaporative cooling unit and the direct evaporative cooling unit, when the first temperature is higher than the third temperature, the first enthalpy is greater than the third enthalpy and the first humidity is greater than the second humidity, wherein the control unit controls the path setting unit to open the first damper unit, close the second damper unit, open the third damper unit, open the fourth unit, close the fifth damper unit, close the sixth damper unit, open the seventh damper unit.

A dehumidification•evaporation cooling-based all-fresh-air air conditioning system according to one embodiment of the present invention may provide, the second information corresponds to a point on a saturation curve of a psychrometric chart (1 atm), the first information corresponds to a point on the psychrometric chart (1 atm), the humidity control unit changes the first humidity to a 1-2 humidity, the indirect evaporative cooling unit changes the first temperature to a 1-2 temperature, and the direct evaporative cooling unit changes the 1-2 humidity to the second humidity, and changes the 1-2 temperature to the second temperature.

A dehumidification•evaporation cooling-based all-fresh-air air conditioning system according to one embodiment of the present invention may provide, the humidity control unit moves the first information which corresponds to a point on the psychrometric chart (1 atm), to y axis direction (absolute humidity), the indirect evaporative cooling unit moves the first information which corresponds to a point on the psychrometric chart (1 atm), to x axis direction (dry bulb temperature), and the direct evaporative cooling unit moves the first information which corresponds to a point on the psychrometric chart (1 atm), to y axis direction (absolute humidity) and x axis direction (dry bulb temperature).

A dehumidification•evaporation cooling-based all-fresh-air air conditioning system according to one embodiment of the present invention may provide, the humidity control unit comprising, a liquid type dehumidification unit, a high temperature heat source supply unit provide high temperature heat source to the liquid type dehumidification unit to recycle a dehumidifying agent used in the liquid type dehumidification, and a low temperature heat source supply unit exchanges heat not to transfer the heat of recycled dehumidifying agent to transferring air, the high temperature heat source supply unit comprising, a solar light heat collector, a circulation unit which circulate raised temperature hot water which is heat exchanged in the solar light heat collector to the liquid type dehumidification unit, and a heat storage unit which store collected heat from the solar light heat collector unit, composed on the circulation unit, the low temperature heat source supply unit comprising, water-side free cooling equipment including cooling tower.

A dehumidification•evaporation cooling-based all-fresh-air air conditioning system according to one embodiment of the present invention may provide, the humidity control unit comprising, a first liquid type dehumidification unit and a second liquid type dehumidification unit, the first liquid type dehumidification unit makes the first humidity to a 1-3 humidity, the second liquid type dehumidification unit makes the 1-3 humidity to a 1-4 humidity, the piping module comprising, the external air and the air supply unit which is transfer passage of a first air and the air supply unit which is transfer passage of a second air, the path setting unit comprising, an eighth damper unit which is installed on an air supply pipe, between the first liquid type dehumidification unit and the second liquid type dehumidification unit, decides air can be transferred from the first liquid type dehumidification unit to the second liquid type dehumidification unit whether the eighth damper is opened or closed, wherein the control unit controls the path setting unit to close the eighth damper unit, when the 1-3 humidity is smaller than the 1-4 humidity or equal to the 1-4 humidity, wherein the control unit controls the path setting unit to open the eighth damper unit, when the 1-3 humidity is greater than the 1-4 humidity.

A dehumidification•evaporation cooling-based all-fresh-air air conditioning system according to one embodiment of the present invention may provide, the temperature control unit comprising, an indirect evaporative cooling unit configured to sensible heat cool supplied air and a direct evaporative cooling unit configured to cool and humidify supplied air, the direct evaporative cooling unit configured to make the 1-4 humidity to the second humidity.

A dehumidification•evaporation cooling-based all-fresh-air air conditioning system according to one embodiment of the present invention may provide, wherein the control unit controls the path setting unit to provide to the piping module for detouring the first liquid type dehumidification unit and the second liquid type dehumidification unit, when the first humidity is smaller than the 1-4 humidity or equal to the 1-4 humidity.

A dehumidification•evaporation cooling-based all-fresh-air air conditioning system manufacturing method according to one embodiment of the present invention may provide, a dehumidification•evaporation cooling-based all-fresh-air air conditioning system control method controls a dehumidification•evaporation cooling-based all-fresh-air air conditioning system comprised with a piping module configured to provide a transfer passage of the external air, the first air and the second air, a humidity control unit configured to controls the humidity of the external air, wherein the humidity control unit located on the piping module, a temperature control unit comprised of an indirect evaporative cooling unit configured to sensible heat cool supplied air and a direct evaporative cooling unit configured to cool and humidify supplied air, and the temperature control unit configured to control temperature, humidity and enthalpy of supplied air to be the first air, wherein the temperature control unit located on the piping module, a path setting unit configured to change a transfer path of the external air, the first air and the second air, wherein the path setting unit located on the piping module, and a control unit which decides the transfer path of the air from the external air inlet to the air conditioning space or the air conditioning space to the outlet, and controls the path setting unit for transferring air to the decided transfer path based on a first information related to a humidity, a temperature and an enthalpy of the external air, wherein the dehumidification•evaporation cooling-based all-fresh-air air conditioning system changes a humidity, temperature and enthalpy of an external air which is provided from an external air inlet, to provide a changed first air to an air conditioning space or discharge a second air stayed in the air conditioning space from the air conditioning space to an outlet, the dehumidification•evaporation cooling-based all-fresh-air air conditioning system control method comprising, a first step of comparing the first information and a second information of a second humidity, a second temperature and a second enthalpy of the first air, and calculates a third information related to a third temperature, a third humidity and a third enthalpy, a second step of comparing the first temperature and the third temperature, a third step of comparing the first enthalpy and the third enthalpy, when decided the first temperature is greater than the third temperature as a result of the second step, a fourth step of comparing the first humidity and the second humidity, when the first enthalpy is greater than the third enthalpy, as a result of the third step.

A dehumidification•evaporation cooling-based all-fresh-air air conditioning system manufacturing method according to one embodiment of the present invention may provide, when it is determined by the stage 2 that the first temperature is smaller than the third temperature, the external air is provided to the air conditioning space, only passes the indirect evaporative cooling unit, when the first temperature is smaller than the third temperature, as a result of the second step.

A dehumidification•evaporation cooling-based all-fresh-air air conditioning system manufacturing method according to one embodiment of the present invention may provide, the external air is provided to the air conditioning space, only passes the direct evaporative cooling unit, when the first enthalpy is smaller than the third enthalpy, as a result of the third step.

A dehumidification•evaporation cooling-based all-fresh-air air conditioning system manufacturing method according to one embodiment of the present invention may provide, the external air is provided to the air conditioning space, only passes the indirect evaporative unit and the direct evaporative cooling unit, when the first humidity is smaller than the second humidity, as a result of the fourth step.

A dehumidification•evaporation cooling-based all-fresh-air air conditioning system manufacturing method according to one embodiment of the present invention may provide, the external air is provided to the air conditioning space, passes the humidity control unit, the indirect evaporative unit and the direct evaporative cooling unit, when the first humidity is greater than the second humidity, as a result of the fourth step.

Advantageous Effects

A dehumidification and evaporation cooling-based all-fresh-air air conditioning system and a method of controlling the same according to the present invention remarkably improve cooling effects by improving operation performance of an all-fresh-air air conditioning system which uses only external air even in a hot and humid environment, for example, the monsoon season in summer of Korea, and can maximize energy saving effects accordingly.

Also, the present invention can always provide a pleasant indoor environment under any operational condition by effectively implementing the concept of a decoupled system which separately performs indoor temperature control and humidity control.

Moreover, the present invention makes it possible to separately control the amount and temperature of supplied air according to different demands for cooling, heating, and ventilation of respective air conditioning spaces even if one air handling unit is used. Therefore, the present invention is very suitable for an increasing trend toward large building complexes that are single buildings in each of which various functions or totally different types of spaces coexist.

Furthermore, the present invention makes it possible to substantially achieve zero carbon emission when a heat source and power required for system operation are supplied through renewable energy, such as geothermal heat, solar heat, sunlight, and wind power, in the future.

MODES OF THE INVENTION

Figure 1:
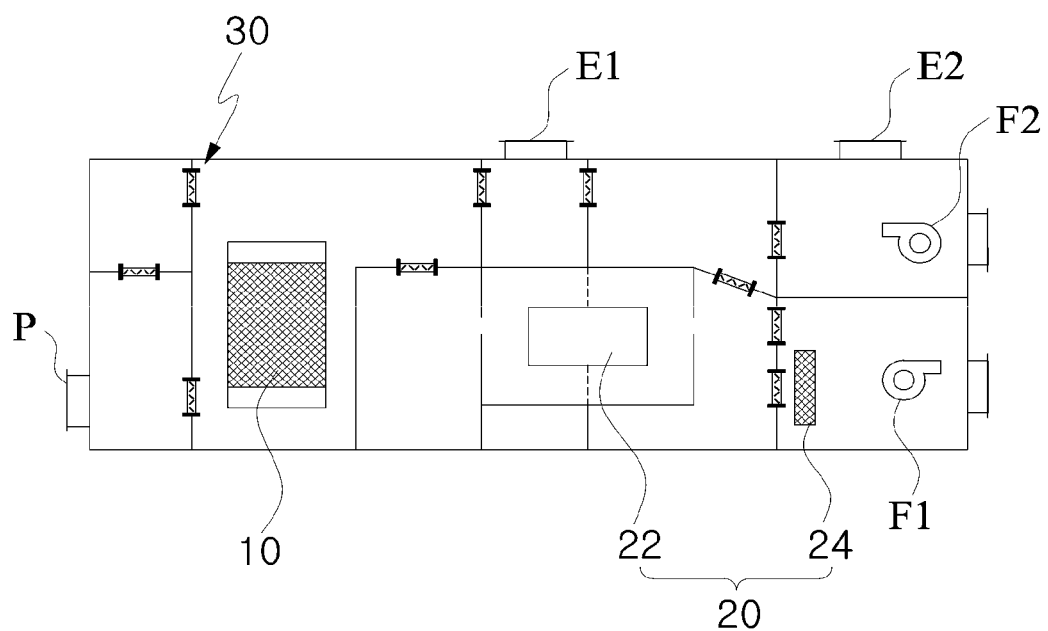
FIG. 1 is a schematic diagram showing a structure of a dehumidification and evaporation cooling-based all-fresh-air air conditioning system according to an embodiment of the present invention.

A dehumidification•evaporation cooling-based all-fresh-air air conditioning system according to one embodiment of the present invention may provide, a dehumidification•evaporation cooling-based all-fresh-air air conditioning system changes a humidity, temperature and enthalpy of an external air which is provided from an external air inlet, to provide a changed first air to an air conditioning space or discharge a second air stayed in the air conditioning space from the air conditioning space to an outlet, the dehumidification•evaporation-based all-fresh-air air conditioning system comprising, a piping module configured to provide a transfer passage of the external air, the first air and the second air, a humidity control unit configured to controls the humidity of the external air, wherein the humidity control unit located on the piping module, a temperature control unit configured to control temperature, humidity and enthalpy of supplied air to be the first air, wherein the temperature control unit located on the piping module, a path setting unit configured to change a transfer path of the external air, the first air and the second air, wherein the path setting unit located on the piping module and a control unit which decides the transfer path of the air from the external air inlet to the air conditioning space or the air conditioning space to the outlet, and controls the path setting unit for transferring air to the decided transfer path based on a first information related to a humidity, a temperature and an enthalpy of the external air.

Hereinafter, embodiments of the present invention will be described in detail with reference to the drawings. However, the spirit of the present invention is not limited to the embodiments set forth herein. Those of ordinary skill in the art can readily propose retrogressive other inventions or other embodiments included in the spirit of the present invention by adding, modifying, or deleting other elements within the same range of spirit, but the scope of the present invention encompasses the inventions or embodiments.

In respective drawings of embodiments, elements having the same function within the same range of spirit will be described using the same reference numeral.

FIG. 1 is a schematic diagram showing a structure of a dehumidification and evaporation cooling-based all-fresh-air air conditioning system according to an embodiment of the present invention.

Referring to FIG. 1, a dehumidification and evaporation cooling-based all-fresh-air air conditioning system 1 (hereinafter "air conditioning system") of the present invention is an air conditioning system that can be applied to an air conditioning system of any building including an apartment house and an office building, and the air conditioning system 1 provides suitable air for users' activities to an air conditioning space in which users doing activities in a building stay.

To this end, the air conditioning system 1 of the present invention may change a humidity, a temperature, an enthalpy, etc. of air outside a building and provide changed first air to an air conditioning space or may discharge second air staying in the air conditioning space from the air conditioning space to an outlet.

The first air may be suitable air for activities of users who do the activities in the air conditioning space, for example, under 1 atm, the first air may have a dry-bulb temperature of 15° C., an absolute humidity of 0.010 kg/kg to 0.015 kg/kg, and an enthalpy corresponding to the dry-bulb temperature and the absolute humidity.

The second air may be the supplied first air which has been changed (contaminated) in activity processes of users in the air conditioning space. The second air may be discharged to the outside through the outlet or mixed with external air for sensible heat exchange in a process of discharging the second air through the outlet.

The air conditioning system 1 may include a piping module, a humidity control unit 10, a temperature control unit, a path setting unit 30, and a control unit.

The piping module may provide a transfer passage of the external air, the first air and the second air, and specifically, the piping module may have an air supply pipe which is a transfer passage of the external air and the first air and an exhaust pipe which is a transfer passage of the second air.

The air supply pipe may form a flow path of the external air from an external air inlet P to the air conditioning space, and the exhaust pipe may form a flow path from the air conditioning space to the outlet.

An air supply fan F1 which induces air to flow from the external air inlet P to the air conditioning space may be positioned on the air supply pipe, and an exhaust fan F2 which induces air to flow from the air conditioning space to the outlet may be positioned on the exhaust pipe. The external air or the second air may be moved to the air supply pipe or the exhaust pipe according to whether the air supply fan F1 or the exhaust fan F2 operates.

The outlet may be a passage for discharging the second air to the outside and include a first outlet E1 and a second outlet E2.

The humidity control unit 10 may be disposed on the piping module and control a humidity of the external air.

The humidity control unit 10 may include a liquid type dehumidification unit, a high-temperature heat source supply unit which provides a high temperature heat source to the liquid type dehumidification part so that a dehumidifying agent used in the liquid type dehumidification unit is regenerated, and a low-temperature heat source supply unit which exchanges heat so that heat of the dehumidifying agent regenerated in the liquid type dehumidification unit is not transferred to moving air.

The high-temperature heat source supply unit may include a high-temperature heat source supply unit for supplying hot wind or hot water for exchanging heat to regenerate the dehumidifying agent which has absorbed humidity in the liquid type dehumidification unit.

Also, the high-temperature heat source supply part may include a sunlight heat collection unit, a circulation unit for circulating hot water heated by heat exchange of the sunlight heat collection unit to the liquid type dehumidification unit, and a heat storage unit which is provided in the circulation unit and stores heat collected by the sunlight heat collection unit.

The humidity control unit 10 may include a low-temperature heat source supply unit for exchanging heat so that heat of the dehumidifying agent regenerated in the liquid type dehumidification unit is not transferred to supplied air.

Also, the low-temperature heat source supply unit may be configured as water-side free cooling equipment including a cooling tower.

The temperature control unit may be disposed on the piping module and generate the first air by controlling a temperature, a humidity, and an enthalpy of supplied air.

Here, the air supplied to the temperature control unit may be humidity-controlled external air flowing in from the external air inlet P. In other words, the supplied air may be air whose humidity has been controlled by the humidity control unit 10.

The temperature control unit may include an indirect evaporative cooling unit 22 configured to cool sensible heat of the supplied air and a direct evaporative cooling unit 24 configured to cool and humidify the supplied air.

The indirect evaporative cooling unit 22 is composed of a dry channel through which the supplied air passes and a wet channel in which water is sprayed, and the sensible heat of the supplied air passing through the indirect evaporative cooling unit 22 is cooled.

The direct evaporative cooling unit 24 is configured to cool and humidify the supplied air passing therethrough so that set conditions of supplied air, that is, states of the first air, may be satisfied.

The direct evaporative cooling unit 24 is composed of a dry channel through which the supplied air passes and a wet channel in which water is sprayed.

The path setting unit 30 may be disposed on the piping module and change transfer paths of the external air, the first air, and the second air. The path setting unit 30 may be dampers or valves which open or close parts of the air supply pipe or the exhaust pipe of the piping module.

Since the air supply pipe or the exhaust pipe opened or closed by the path setting unit 30 is moved along a pipe of another movable path, a transfer path of air may be changed by the path setting unit 30.

Specifically, the path setting unit 30 may include a first damper unit 31 which is installed in the air supply pipe between the external air inlet P and the humidity control unit 10 and decides whether air can be moved from the external air inlet P to the humidity control unit 10 according to whether the first damper unit 31 is opened or closed, a second damper unit 32 which is installed in the air supply pipe between the external air inlet P and the temperature control unit and decides whether air can be moved from the external air inlet P to the temperature control unit according to whether the second damper unit 32 is opened or closed, a third damper unit 33 which is installed in the air supply pipe on an entrance side of the indirect evaporative cooling unit 22 and decides whether air can be moved to the indirect evaporative cooling unit 22 according to whether the third damper unit 33 is opened or closed, a fourth damper unit 34 which is installed in the air supply pipe on an entrance side of the direct evaporative cooling unit 24 and decides whether air can be moved to the direct evaporative cooling unit according to whether the fourth damper unit 34 is opened or closed, a fifth damper unit 35 which is installed in the air supply pipe between the second damper unit 32 and the fourth damper part 34 and decides whether air can be moved from the second damper unit 32 to the fourth damper unit 34 according to whether the fifth damper unit 35 is opened or closed, a sixth damper unit 36 which is installed in the air supply pipe between the fifth damper unit 35 and the air conditioning space and decides whether air can be moved from the fifth damper unit 35 to the air conditioning space according to whether the sixth damper unit 36 is opened or closed, and a seventh damper unit 37 which is installed in the air supply pipe between the air conditioning space and the first outlet E1 and decides whether air can be moved from the air conditioning space to the first outlet E1 according to whether the seventh damper unit 37 is opened or closed.

The control unit may decide a transfer path of air from the external air inlet P to the air conditioning space or from the air conditioning space to the outlet on the basis of first information on the humidity, the temperature, and the enthalpy of the external air and control the path setting unit 30 in order to move the air to the decided transfer path.

The first information may include information on a first humidity, a first temperature, and a first enthalpy of the external air.

The control unit may compare second information on a second humidity, a second temperature, and a second enthalpy of the first air with the first information to control the path setting unit 30.

Also, the control unit may compare the first information with the second information to calculate third information for controlling the path setting unit 30 and may control the path setting unit 30 on the basis of the calculated third information.

The third information may include information on a third temperature, a third humidity, and a third enthalpy.

The control unit may set the third temperature equal to the second temperature when the first temperature is higher than the second temperature, and may set the third temperature higher than the second temperature when the first temperature is higher than the second temperature.

For example, when the first temperature of the external air is 20° C. and the second temperature which is a temperature set for air supplied to the air conditioning space is 15° C., the control unit may set the third temperature to 15° C. to operate the air conditioning system 1, and when the first temperature of the external air is 10° C. and the second temperature is 15° C., the control unit may set the third temperature to 20° C. to operate the air conditioning system 1.

Here, the third enthalpy may be set to a value calculated from the third temperature and the third humidity. According to the above example, when the third temperature is set to 15° C., the third enthalpy may be a value calculated from a dry-bulb temperature of 15° C. and a relative humidity of 1, and when the third temperature is set to 20° C., the third enthalpy may be a value calculated from a dry-bulb temperature of 20° C. and a relative humidity of 1.

To summarize, the first temperature of the control unit which will be described below with reference to FIGS.-to-may be a dry-bulb temperature of the external air, the third temperature may be a temperature set according to a comparison between the first temperature and the second temperature, the first enthalpy may be an enthalpy value calculated according to values of the first temperature (dry-bulb temperature) and the first humidity (relative humidity) of the external air, and the third enthalpy may be a value calculated from the third temperature and a relative humidity of 1.

FIGS. 2 to 5 are schematic diagrams illustrating air flow in the dehumidification and evaporation cooling-based all-fresh-air air conditioning system according to an embodiment of the present invention.

Figure 2:
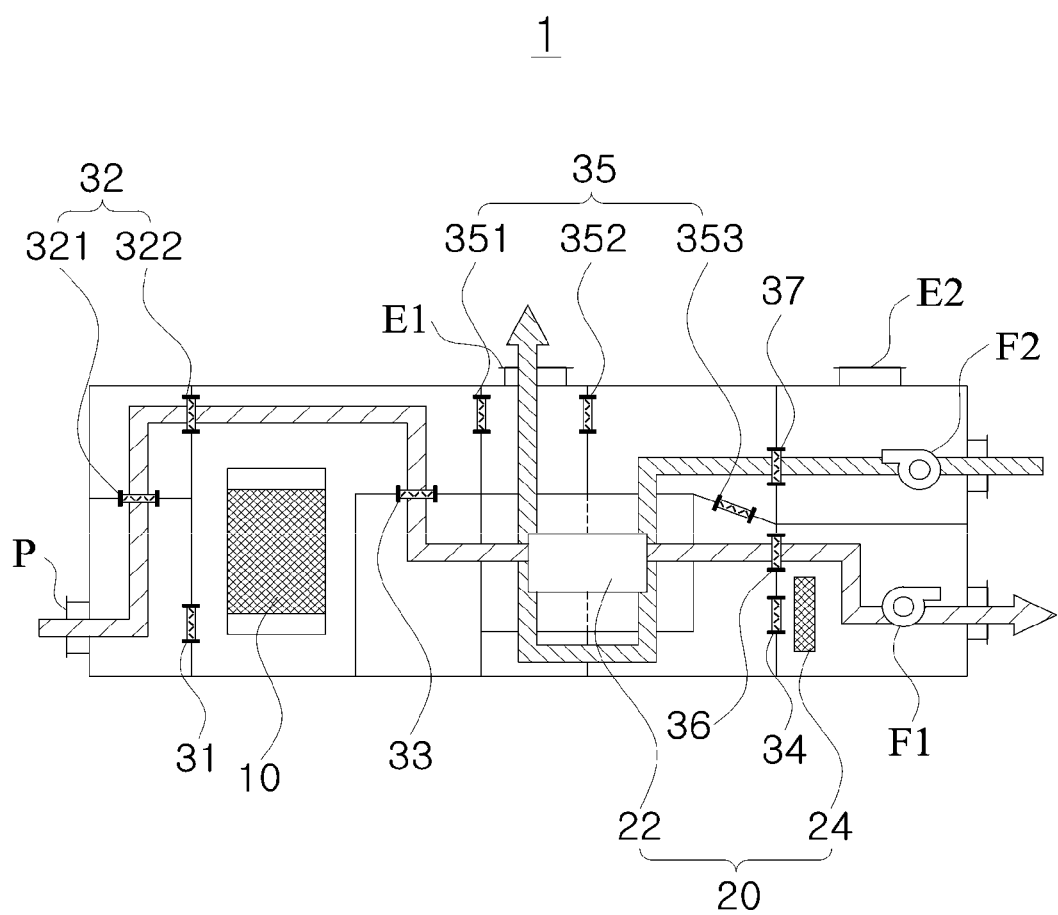
FIGS. 2 to 5 are schematic diagrams illustrating air flow in the dehumidification and evaporation cooling-based all-fresh-air air conditioning system according to an embodiment of the present invention.

Referring to FIG. 2, when the first temperature is lower than the third temperature (hereinafter, a first mode), the control unit may control the path setting unit 30 such that the external air passes only the indirect evaporative cooling unit 22.

Specifically, the control unit may control the path setting unit 30 to close the first damper unit 31, open the second damper unit 32, open the third damper unit 33, close the fourth damper unit 34, close the fifth damper unit 35, open the sixth damper unit 36, and open the seventh damper unit 37.

For a form in which the air supply pipe is disposed and convenience of implementation in partitioned spaces, the second damper unit 32 may be composed of a 2-1 damper unit 321 and a 2-2 damper unit 322, but the second damper unit 32 is not limited thereto, and for this reason, the number of damper units constituting the second damper unit 32 may be increased or decreased.

For the same reason, the fifth damper unit 35 may be composed of a 5-1 damper unit, a 5-2 damper unit, and a 5-3 damper unit.

Since damper units constituting a damper unit are merely examples for a form in which the air supply pipe is disposed and convenience of implementation in partitioned spaces, damper units are not limited thereto.

The case in which the first temperature is lower than the third temperature may correspond to, for example, a state of external air in winter of Korea, and in this case, the air conditioning system 1 may operate in an operation mode for winter.

Specifically, when the external air flowing in from the external air inlet P is moved through the air supply pipe, the external air is supplied to the indirect evaporative cooling unit 22 through the second damper unit 32 and the third damper unit 33. At this time, the external air may not pass the humidity control unit 10 and the direct evaporative cooling unit 24.

Also, air supplied to the indirect evaporative cooling unit 22 may not be cooled by the indirect evaporative cooling unit 22. In other words, the indirect evaporative cooling unit 22 may not be supplied with water in order not to cool the supplied external air, and the indirect evaporative cooling unit 22 may be used to provide a space so that the supplied air and the second air flowing in from the air conditioning space exchange heat with each other.

In brief, the indirect evaporative cooling unit 22 may be used to provide a space in which the supplied air takes heat from the second air.

Also, the second air in the air conditioning space may be supplied to the indirect evaporative cooling unit 22 through the open seventh damper and discharged from the indirect evaporative cooling unit 22 to the outside through the first outlet E1. In this case, due to the exhaust fan F2, the second air may flow from the air conditioning space to the indirect evaporative cooling unit 22.

The air which has been heat-exchanged with the second air in the indirect evaporative cooling unit 22 may flow in states of the first air to the air conditioning space through the air supply fan F1.

Figure 3:
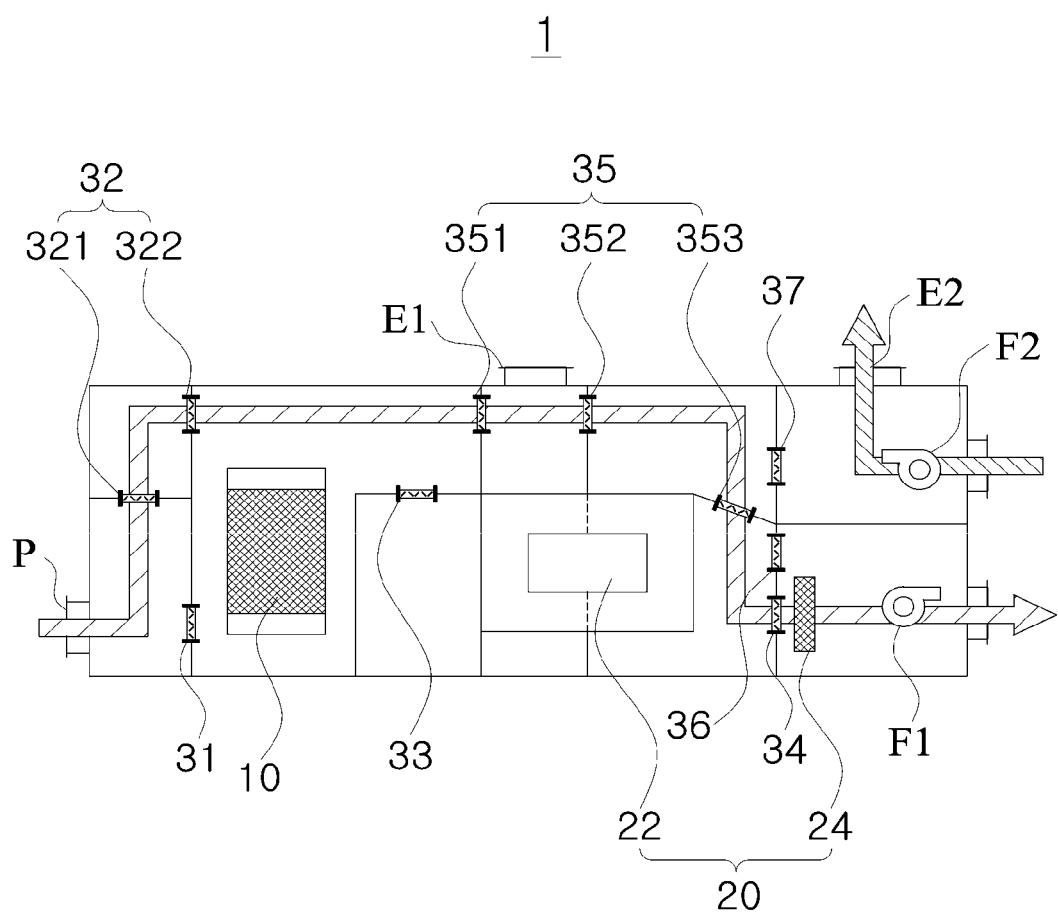

Referring to FIG. 3, when the first temperature is higher than the third temperature and the first enthalpy is less than the third enthalpy (hereinafter, a second mode), the control unit may control the path setting unit 30 such that the external air passes only the direct evaporative cooling unit 24.

Specifically, the control unit may control the path setting unit 30 to close the first damper unit 31, open the second damper unit 32, close the third damper unit 33, open the fourth damper unit 34, open the fifth damper unit 35, close the sixth damper unit 36, and close the seventh damper unit 37.

The case in which the first temperature is higher than the third temperature and the first enthalpy is less than the third enthalpy may correspond to, for example, air states similar to external air conditions in an intermediate season (spring or fall) of Korea. The air conditioning system 1 may operate in an operation mode for spring or fall.

The external air flowing in from the external air inlet P may be supplied to the direct evaporative cooling unit 24 through the open second damper unit 32, the open fifth damper unit 35, and the open fourth damper unit 34, and the external air may be provided in the states of the first air to the air conditioning space by the direct evaporative cooling unit 24.

In this case, due to the air supply fan F1, the first air may flow from the direct evaporative cooling unit 24 to the air conditioning space.

Since the fifth damper unit 35 is closed, the second air staying in the air conditioning space may be discharged from the air conditioning space through the second outlet E2.

Figure 4:
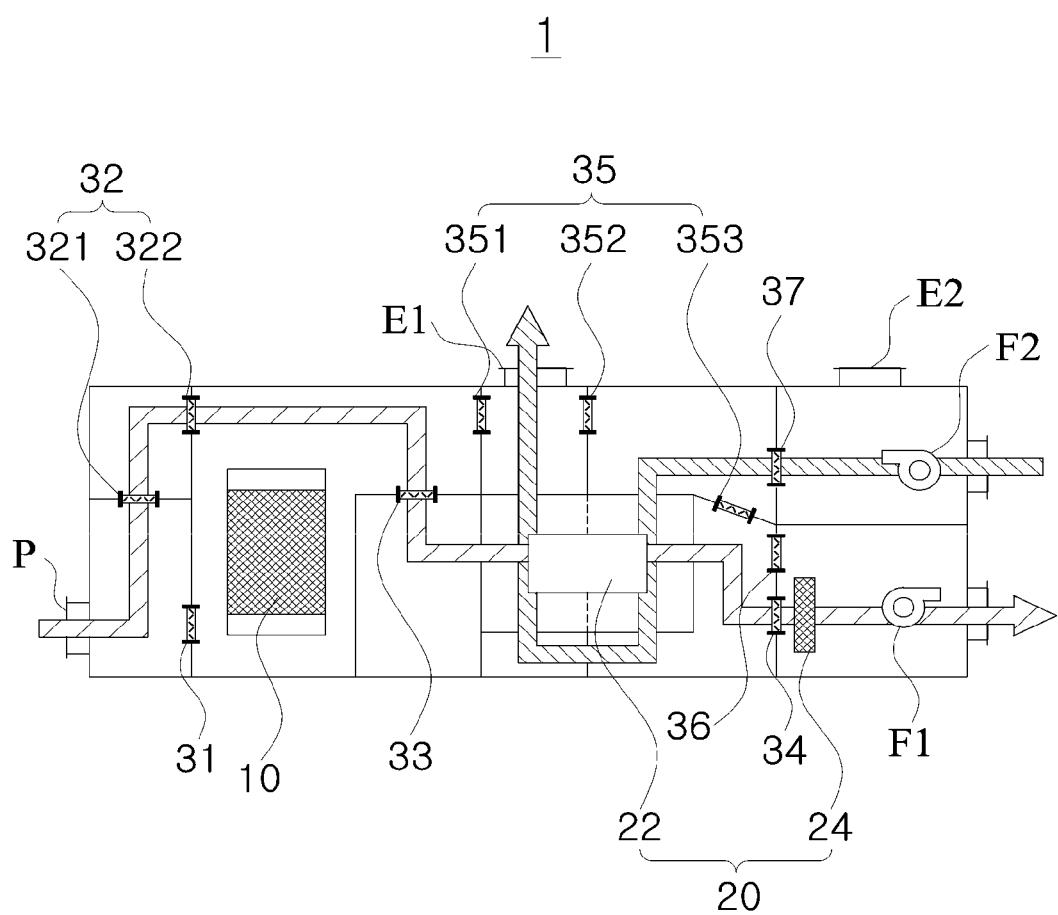

Referring to FIG. 4 when the first temperature is higher than the third temperature, the first enthalpy is greater than the third enthalpy, and the first humidity is lower than the second humidity (hereinafter, a third mode), the control unit may control the path setting unit 30 such that the external air passes only the indirect evaporative cooling unit 22 and the direct evaporative cooling unit 24.

Specifically, the control unit may control the path setting unit 30 to close the first damper unit 31, open the second damper unit 32, open the third damper unit 33, open the fourth damper unit 34, close the fifth damper unit 35, close the sixth damper unit 36, and open the seventh damper unit 37.

The case in which the first temperature is higher than the third temperature, the first enthalpy is greater than the third enthalpy, and the first humidity is lower than the second humidity may correspond to, for example, air states similar to external air conditions in an intermediate season (spring or fall) of Korea.

The external air flowing in from the external air inlet P may be supplied to the indirect evaporative cooling unit 22 through the open second damper unit 32 and the open third damper unit 33, and in this case, the second air in the air conditioning space may be supplied to the indirect evaporative cooling unit 22 through the open seventh damper unit 37.

Also, the air supplied through the third damper unit 33 and the second air may exchange sensible heat with each other in the indirect evaporative cooling unit 22, and simultaneously, the air may be cooled by the indirect evaporative cooling unit 22.

The air cooled by the indirect evaporative cooling unit 22 may be supplied to the direct evaporative cooling unit 24 through the open fourth damper unit 34, may be cooled by the direct evaporative cooling unit 24, and may flow in the states of the first air to the air conditioning space.

Figure 5:
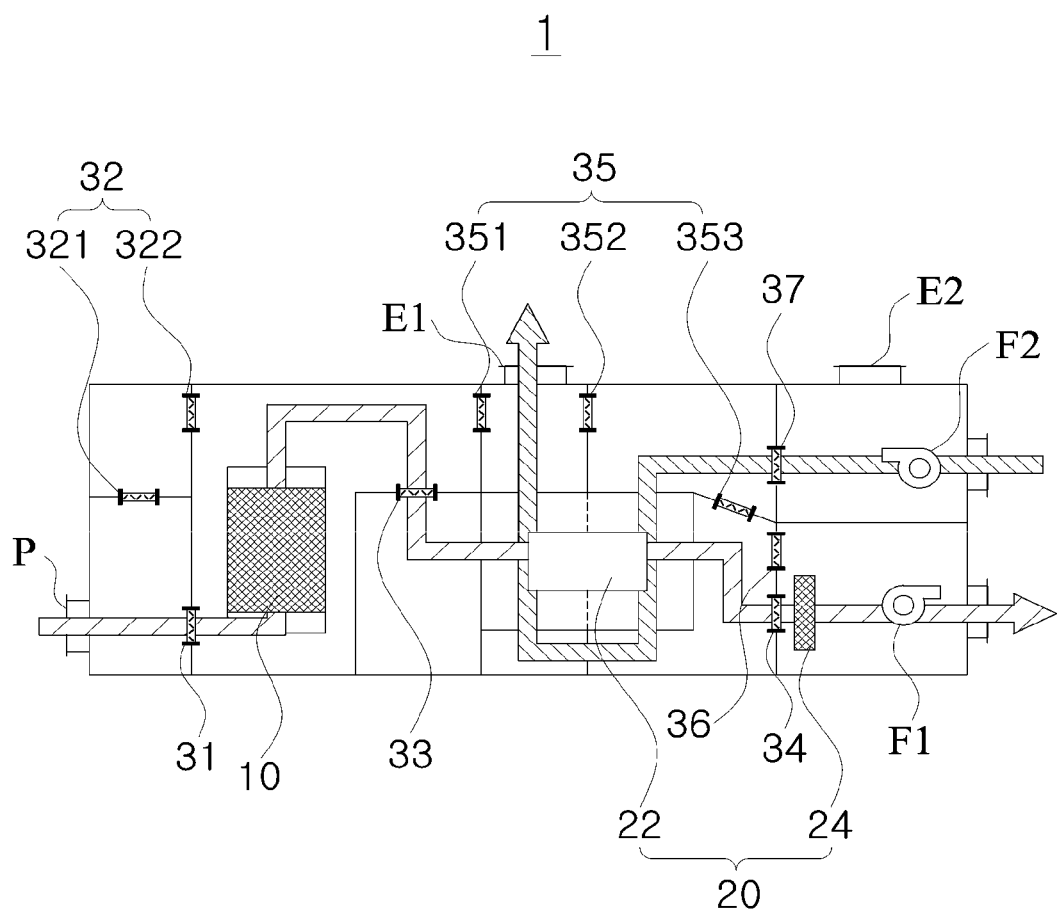

Referring to FIG. 5, when the first temperature is higher than the third temperature, the first enthalpy is greater than the third enthalpy, and the first humidity is higher than the second humidity (hereinafter, a fourth mode), the control unit may control the path setting unit 30 such that the external air passes the humidity control unit 10, the indirect evaporative cooling unit 22, and the direct evaporative cooling unit 24.

Specifically, the control unit may control the path setting unit 30 to open the first damper unit 31, close the second damper unit 32, open the third damper unit 33, open the fourth damper unit 34, close the fifth damper unit 35, close the sixth damper unit 36, and open the seventh damper unit 37.

The case in which the first temperature is higher than the third temperature, the first enthalpy is greater than the third enthalpy, and the first humidity is higher than the second humidity may correspond to, for example, hot and humid external air conditions of summer in Korea.

The external air flowing in from the external air inlet P may be supplied to the humidity control unit 10 through the open first damper unit 31, and the air whose humidity has been controlled through the humidity control unit 10 may be supplied to the indirect evaporative cooling unit 22 through the third damper unit 33 and cooled.

The second air in the air conditioning space may be supplied to the indirect evaporative cooling unit 22 through the open seventh damper and discharged to the outside through the first outlet E1.

In this case, the air supplied through the third damper unit 33 and the second air may exchange sensible heat with each other in the indirect evaporative cooling unit 22, and simultaneously, the air may be cooled by the indirect evaporative cooling unit 22.

The air cooled by the indirect evaporative cooling unit 22 may be supplied to the direct evaporative cooling unit 24 through the open fourth damper unit 34, may be cooled by the direct evaporative cooling unit 24, and may flow in the states of the first air to the air conditioning space.

Figure 6:
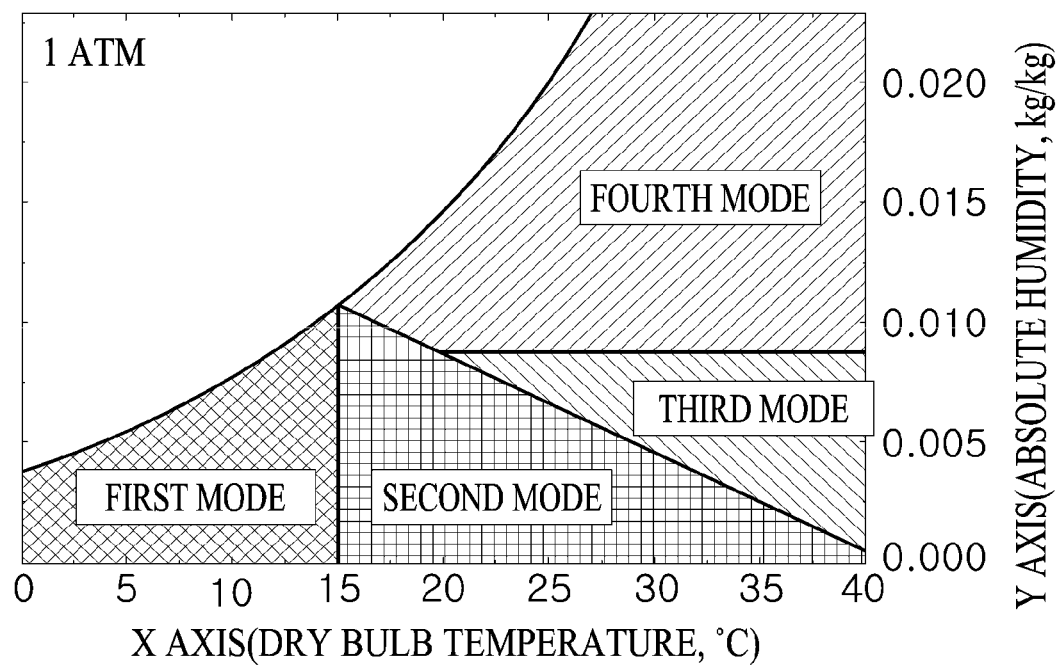
FIG. 6 is a psychrometric chart illustrating respective modes of the dehumidification and evaporation cooling-based all-fresh-air air conditioning system according to an embodiment of the present invention.

FIG. 6 is a psychrometric chart illustrating respective modes of dehumidification and evaporation cooling-based all-fresh-air air conditioning system according to an embodiment of the present invention.

Referring to FIG. 6, states of the first air having the second humidity and the second temperature according to the second information are shown as a point on the saturation curve of the psychrometric chart (1 atm), and states of the external air having the first humidity and the first temperature according to the first information are shown as a point on the saturation curve of the psychrometric chart (1 atm).

The air conditioning system 1 of the present invention may be an air processing system for moving a point indicating states of the external air to a point indicating states of the first air and supplying the first air to the air conditioning space.

The humidity control unit 10 changes the first humidity to a 1-2 humidity, which may be implemented by the above-described liquid type dehumidification unit, the high-temperature heat source supply unit, and the low-temperature heat source supply unit.

The humidity control unit 10 may cause the first information corresponding to the point on the psychrometric chart (1 atm) to move in a y-axis direction (absolute humidity), and in this case, a path along which the point moves may be a straight line, that is, the point corresponding to the first information may move straight in a y-axis direction. In other words, the humidity control unit 10 may not change a dry-bulb temperature of air and may get involved in only a change in absolute humidity.

The 1-2 humidity may be lower than the second humidity. This is intended for humidity control according to humidification of the direct evaporative cooling unit 24 which will be described below.

The indirect evaporative cooling unit 22 may change the first temperature to a 1-2 temperature, which may be a temperature between the first temperature and the second temperature. This is intended for temperature control according to second cooling of the direct evaporative cooling unit 24 which will be described below.

The indirect evaporative cooling unit 22 may cause the first information corresponding to the point on the psychrometric chart (1 atm) to move in an x-axis direction (dry-bulb temperature), and in this case, a path along which the point moves may be a straight line, that is, the point corresponding to the first information may move straight in an x-axis direction. In other words, the indirect evaporative cooling unit 22 may not change an absolute humidity of air and may get involved in only a change in dry-bulb temperature.

The direct evaporative cooling unit 24 may change the 1-2 humidity to the second humidity and may change the 1-2 temperature to the second temperature.

The direct evaporative cooling unit 24 may cause the first information corresponding to the point on the psychrometric chart (1 atm) to move in a y-axis direction (absolute humidity) and an x-axis direction (dry-bulb temperature) and in this case, a path along which the point moves may be a curved line or a straight line, that is, the point corresponding to the 1-2 temperature and the 1-2 humidity may be simultaneous moved in an x-axis direction (dry-bulb temperature) and a y-axis direction (absolute humidity) and thus may make a curved line motion or a straight line motion. In other words, the direct evaporative cooling unit 24 may simultaneously get involved in changes in absolute humidity and dry-bulb temperature.

Figure 7:
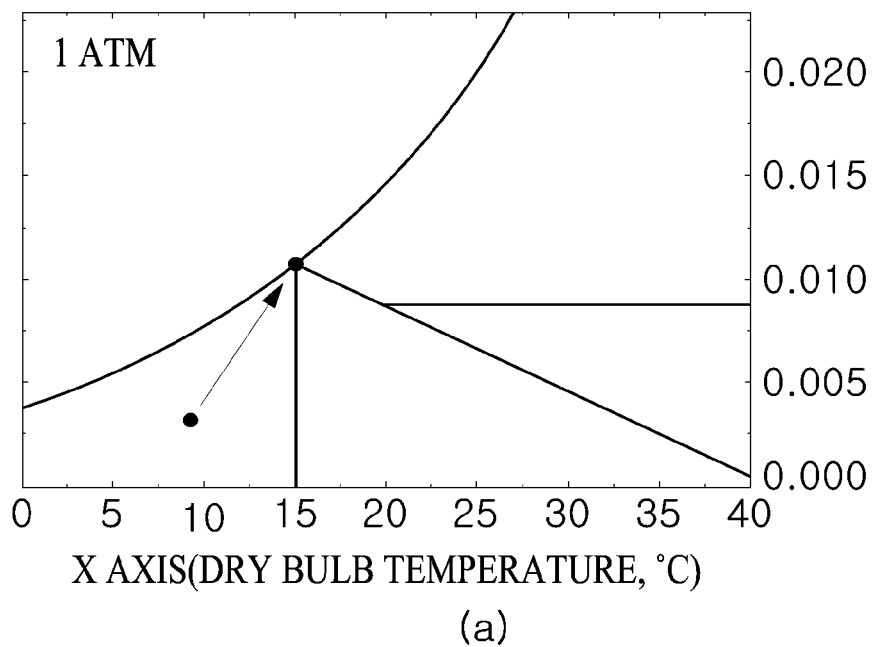
FIGS. 7 and 8 are schematic diagrams illustrating respective modes of the dehumidification and evaporation cooling-based all-fresh-air air conditioning system according to an embodiment of the present invention.
Figure 7:
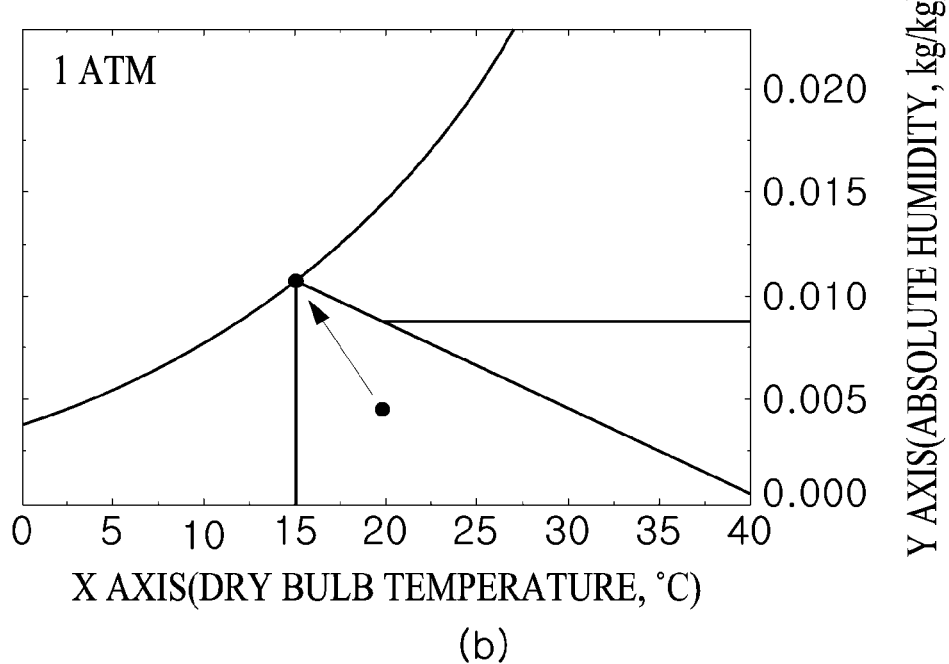
Figure 8:
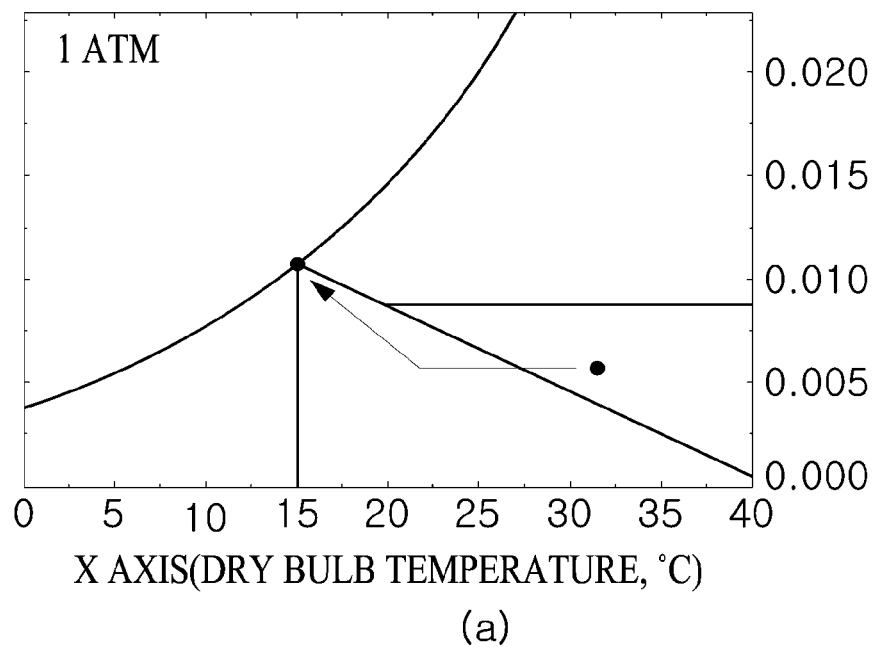
Figure 8:
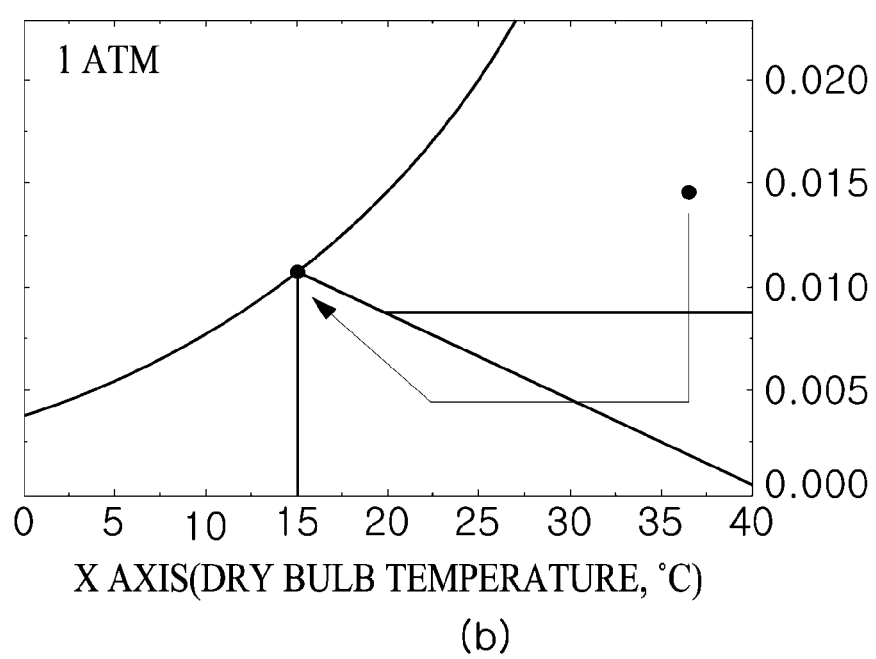

FIGS. 7 and 8 are schematic diagrams illustrating respective modes of the dehumidification and evaporation cooling-based all-fresh-air air conditioning system according to an embodiment of the present invention.

FIG. 7A shows a case in which when states of the external air correspond to the first mode, the flow path of air may be set so that the external air passes only the indirect evaporative cooling unit 22.

In this case, as described above, the indirect evaporative cooling unit 22 is used to provide a space in which supplied air takes heat from the second air, and the external air corresponding to the first mode may move from a point on the psychrometric chart corresponding to the first information to a point on the psychrometric chart corresponding to the second information, that is, may vary in states (temperature, humidity, and enthalpy), due to sensible heat exchange with the second air flowing in from the air conditioning space.

FIG. 7B shows a case in which when states of the external air correspond to the second mode, the flow path of air may be set so that the external air passes only the direct evaporative cooling unit 24.

As described above, since the direct evaporative cooling unit 24 can cause the first information corresponding to a point on the psychrometric chart (1 atm) to move in a y-axis direction (absolute humidity) and an x-axis direction (dry-bulb temperature), the point on the psychrometric chart corresponding to the first information in the second mode may be moved to a point on the psychrometric chart corresponding to the second information, that is, may vary in states (temperature, humidity, and enthalpy), by the direct evaporative cooling unit 24.

FIG. 8A shows a case in which when states of the external air correspond to the third mode, the flow path of air may be set so that the external air passes only the indirect evaporative cooling unit 22 and the direct evaporative cooling unit 24.

As described above, the indirect evaporative cooling unit 22 can cause the first information corresponding to a point on the psychrometric chart (1 atm) to move in an x-axis direction (dry-bulb temperature), and the direct evaporative cooling unit 24 can cause the first information corresponding to the point on the psychrometric chart (1 atm) to move in a y-axis direction (absolute humidity) and an x-axis direction (dry-bulb temperature), therefore, the point on the psychrometric chart corresponding to the first information in the third mode may be moved to a point on the psychrometric chart corresponding to the second information, that is, may vary in states (temperature, humidity, and enthalpy).

FIG. 8B shows a case in which when states of the external air correspond to the fourth mode, the flow path of air may be set so that the external air passes the humidity control unit 10, the indirect evaporative cooling unit 22, and the direct evaporative cooling unit 24.

As described above, the humidity control unit 10 can cause the first information corresponding to a point on the psychrometric chart (1 atm) to move in a y-axis direction (absolute humidity), the indirect evaporative cooling unit 22 can cause the first information corresponding to the point on the psychrometric chart (1 atm) to move in an x-axis direction (dry-bulb temperature), and the direct evaporative cooling unit 24 can cause the first information corresponding to the point on the psychrometric chart (1 atm) to move in a y-axis direction (absolute humidity) and an x-axis direction (dry-bulb temperature), therefore, the point on the psychrometric chart corresponding to the first information in the fourth mode may be moved to a point on the psychrometric chart corresponding to the second information, that is, may vary in states (temperature, humidity, and enthalpy).

Figure 9:
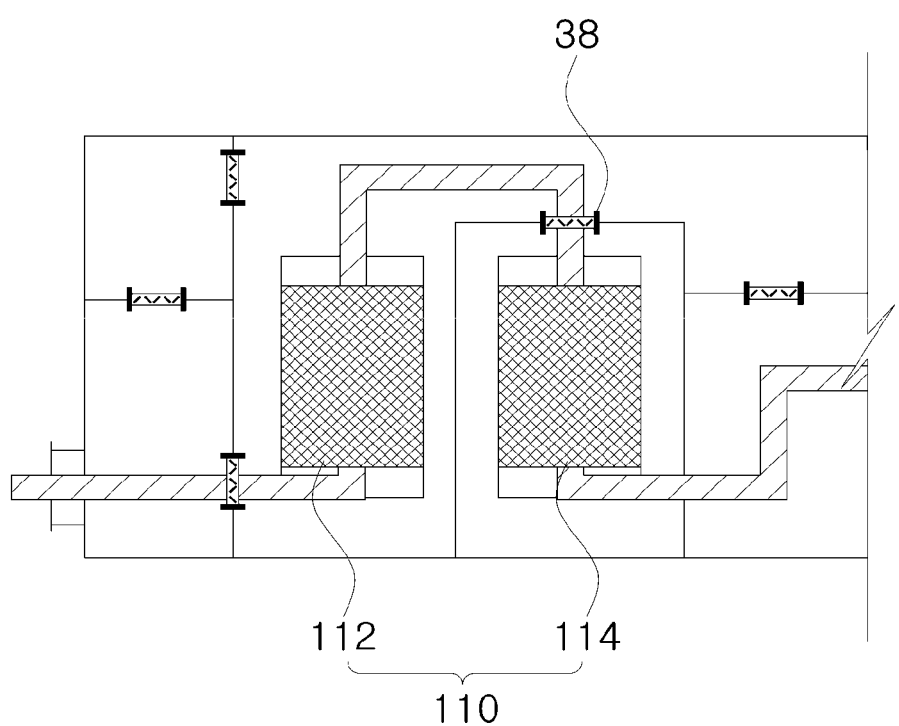
FIGS. 9 to 11 are diagrams showing partial structures of a dehumidification and evaporation cooling-based all-fresh-air air conditioning system according to another embodiment of the present invention.
Figure 10:
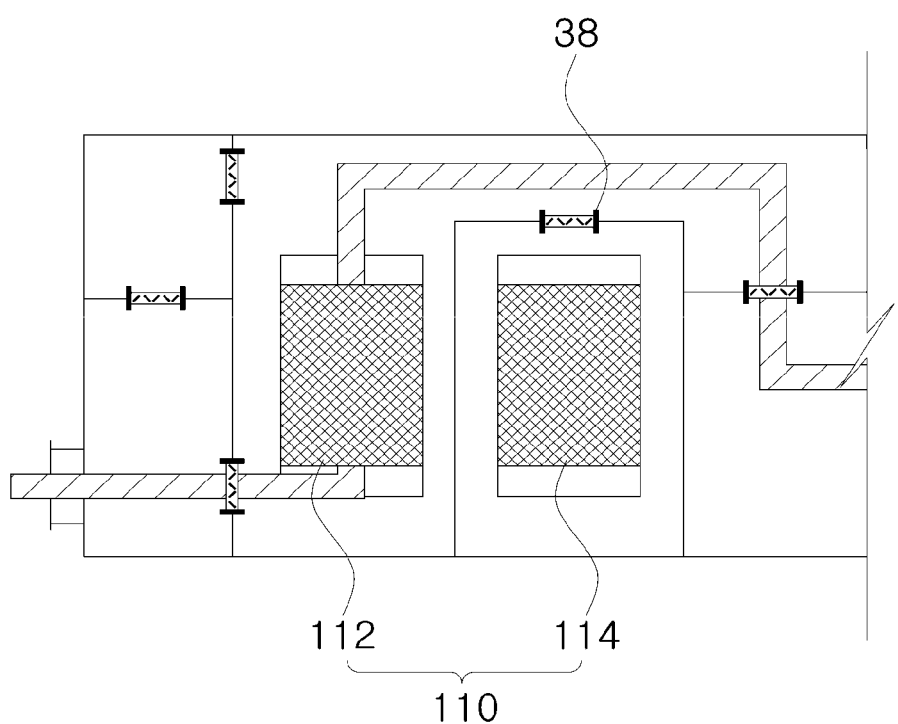
Figure 11:
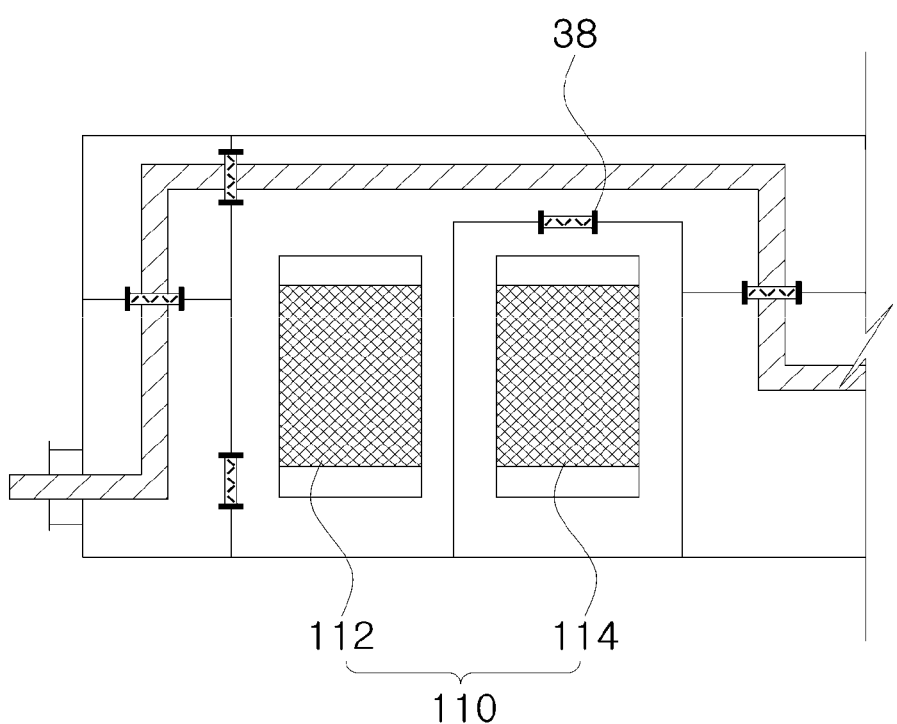

FIGS. 9 to 11 are diagrams showing partial structures of a dehumidification and evaporation cooling-based all-fresh-air air conditioning system according to another embodiment of the present invention.

Referring to FIGS. 9 to 11, the air conditioning system according to the other embodiment of the present invention has the same structure and effects as the air conditioning system described above with reference to FIGS. 1 to 8 except for a humidity control unit 110, a control unit, and a path setting unit 130, therefore, only the humidity control unit 110, the control unit, and the path setting unit 130 will be described.

The humidity control unit 110 may include a first liquid type dehumidification unit 112 and a second liquid type dehumidification unit 114.

The first liquid type dehumidification unit 112 may perform dehumidification so that the first humidity becomes a 1-3 humidity, and the second liquid type dehumidification unit 114 may perform dehumidification so that the 1-3 humidity becomes a 1-4 humidity (see FIG. 9).

When the 1-3 humidity is lower than or equal to the 1-4 humidity, the control unit may control the path setting unit so that air may be provided to the piping module through a detour around the second liquid type dehumidification unit 114 (see FIG. 10).

In brief, when air is not sufficiently dehumidified by the first liquid type dehumidification unit 112 in a process in which the humidity control unit 110 causes the first humidity to be the 1-4 humidity, the air may be supplied to the second liquid type dehumidification unit 114 for re-dehumidification, and for this reason, dual liquid type dehumidification units are employed.

Also, when it is determined that air has been sufficiently dehumidified by the first liquid type dehumidification unit 112 (when the 1-3 humidity is lower than or equal to the 1-4 humidity), the air may be supplied to a temperature control unit which is disposed behind the second liquid type dehumidification unit 114 through a detour around the second liquid type dehumidification unit 114.

Here, the 1-4 humidity is a humidity that should be controlled by the humidity control unit 110 so that the first air is provided to the air conditioning space, and the 1-4 humidity may be equal to the first humidity of the first air or may be set lower than the first humidity of the first air by considering that the air is humidified by a direct evaporative cooling unit disposed behind the humidity control unit 110.

The path setting unit may further include an eighth damper unit 38 which is installed in an air supply pipe between the first liquid type dehumidification unit 112 and the second liquid type dehumidification unit 114 and decides whether air can be moved from the first liquid type dehumidification unit 112 to the second liquid type dehumidification unit 114 according to whether the eighth damper unit 38 is opened or closed.

When the 1-3 humidity is higher than the 1-4 humidity, the control unit may control the path setting unit to open the eighth damper unit 38.

When the 1-3 humidity is lower than or equal to the 1-4 humidity, the control unit may control the path setting unit to close the eighth damper unit 38.

When the first humidity is lower than or equal to the 1-4 humidity, a first damper unit may be closed and a second damper unit may be opened, such that the external air may detour around both the first liquid type dehumidification unit 112 and the second liquid type dehumidification unit 114 (see FIG. 11).

Air which passes or detours around the humidity control unit 110 may be cooled by the temperature control unit, at this time, the 1-4 humidity of the air supplied to the temperature control unit may become the second humidity by the direct evaporative cooling unit.

Figure 12:
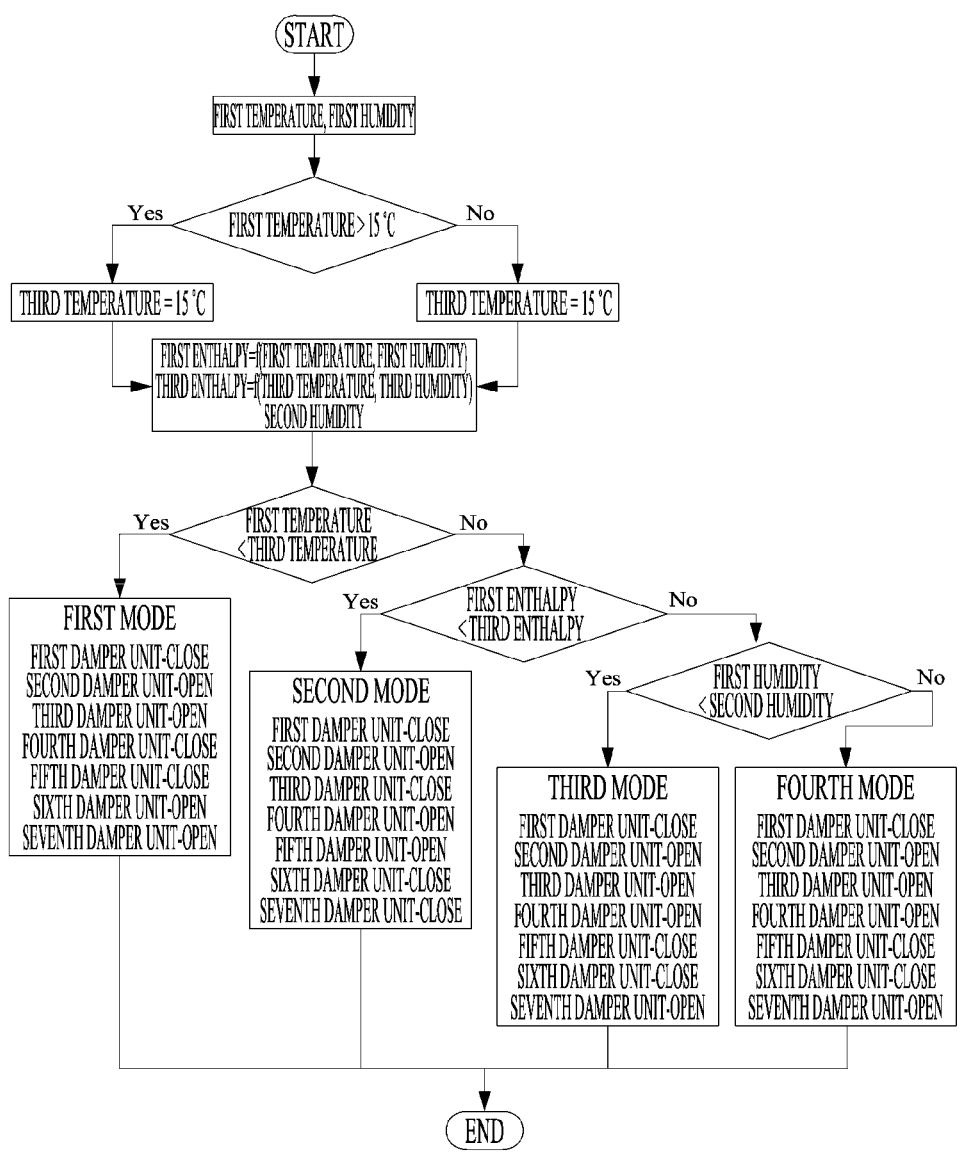
FIG. 12 is a flowchart illustrating a method of controlling a dehumidification and evaporation cooling-based all-fresh-air air conditioning system according to an embodiment of the present invention.

FIG. 12 is a flowchart illustrating a method of controlling a dehumidification and evaporation cooling-based all-fresh-air air conditioning system according to an embodiment of the present invention.

Referring to FIG. 12, the method of controlling a dehumidification and evaporation cooling-based all-fresh-air air conditioning system, which includes a piping module providing a transfer passage of external air, first air, and second air, a humidity control unit disposed on the piping module and controlling a humidity of the external air, a temperature control unit disposed on the piping module and including an indirect evaporative cooling unit configured to generate the first air by controlling a temperature, a humidity, and an enthalpy of supplied air and cool sensible heat of the supplied air and a direct evaporative cooling unit configured to cool and humidify the supplied air, a path setting unit disposed on the piping module and changing a transfer path of the external air, the first air, and the second air, and a control unit deciding a transfer path of air from an external air inlet to an air conditioning space or from the air conditioning space to an outlet on the basis of first information on a first humidity, a first temperature, and a first enthalpy of the external air and controlling the path setting unit in order to move the air to the decided transfer path, and changes the humidity, a temperature, and an enthalpy of the external air to provide the changed first air to the air conditioning space or discharge the second air stayed in the air conditioning space from the air conditioning space to the outlet, according to an embodiment of the present invention may include a first step of calculating third information on a third temperature, a third humidity, and a third enthalpy by comparing the first information with second information on a second humidity, a second temperature, and a second enthalpy of the first air, a second step of comparing the first temperature and the third temperature, a third step of comparing the first enthalpy with the third enthalpy when it is determined in the second step that the first temperature is higher than the third temperature, and a fourth step of comparing the first humidity with the second humidity when it is determined in the third step that the first enthalpy is greater than the third enthalpy.

When it is determined in the second step that the first temperature is lower than the third temperature, the external air may be provided to the air conditioning space through only the indirect evaporative cooling unit 22 (see FIG. 1).

When it is determined in the third step that the first enthalpy is less than the third enthalpy, the external air may be provided to the air conditioning space through only the direct evaporative cooling unit 24 (see FIG. 1).

When it is determined in the fourth step that the first humidity is lower than the second humidity, the external air may be provided to the air conditioning space through only the indirect evaporative cooling unit and the direct evaporative cooling unit.

When it is determined in the fourth step that the first humidity is higher than the second humidity, the external air may be provided to the air conditioning space through the humidity control unit, the indirect evaporative cooling unit, and the direct evaporative cooling unit.

Since the method of controlling the dehumidification and evaporation cooling-based all-fresh-air air conditioning system has been described in detail in connection with the dehumidification and evaporation cooling-based all-fresh-air air conditioning system, detailed description thereof will be omitted.

Structures and features of the present invention have been described above according to embodiments of the present invention, but the present invention is not limited thereto. Those of ordinary skill in the art to which the present invention pertains should clearly understand that the embodiments can be altered or modified in various ways within the spirit and scope of the present invention. Therefore, it is noted that such alterations or modifications belong to the following claims.

What is claimed is:

1. A dehumidification•evaporation cooling-based all-fresh-air air conditioning system changes a humidity, temperature and enthalpy of an external air which is provided from an external air inlet, to provide changed first air to an air conditioning space or discharge second air stayed in the air conditioning space from the air conditioning space to an outlet, the dehumidification•evaporation-based all-fresh-air air conditioning system comprising:
 a plurality of pipes configured to provide a transfer path of the external air, the first air and the second air;
 a humidity controller located on the plurality of pipes and configured to control the humidity of the external air; a temperature controller located on the plurality of pipes and configured to control temperature, humidity and enthalpy of supplied air to be the first air;
 a plurality of dampers located on the plurality of pipes and configured to change a transfer path of the external air, the first air and the second air; and
 a controller which decides the transfer path of the air from the external air inlet to the air conditioning space or from the air conditioning space to the outlet, and controls the plurality of dampers for transferring air to the decided transfer path based on first information related to a humidity, a temperature and an enthalpy of the external air,
 wherein the first information includes information about a first humidity, a first temperature and a first enthalpy of the external air,
 wherein second information includes information about a second humidity, a second temperature and a second enthalpy of the first air,
 wherein the controller controls the plurality of dampers based on third information,
 wherein the third information includes a third temperature, a third humidity and a third enthalpy,
 wherein the controller sets the third temperature to be equal to the second temperature when the first temperature is higher than the second temperature, and sets the third temperature to be higher than the second temperature when the second temperature is higher than the first temperature, and
 wherein the third enthalpy is obtained from the third temperature and a predetermined relative humidity.

2. The dehumidification•evaporation cooling-based all-fresh-air air conditioning system according to claim 1,
 wherein the temperature controller comprising:
 an indirect evaporative cooler configured to cool supplied air by a sensible cooling method; and
 a direct evaporative cooler configured to cool and humidify supplied air.

3. The dehumidification•evaporation cooling-based all-fresh-air air conditioning system according to claim 2,
 wherein the plurality of pipes comprise:
 an air supply pipe;
 an exhaust pipe; and
 the outlet comprising a first outlet and a second outlet, and
 wherein the plurality of dampers comprise:
 a first damper which is installed on an air supply pipe, between the external air inlet and the humidity controller, such that air can be transferred from the external air inlet to the humidity controller according to whether the first damper is opened or closed,
 a second damper which is installed on an air supply pipe, between the external air inlet and the temperature controller, such that air can be transferred from the external air inlet to the temperature controller according to whether the second damper is opened or closed,
 a third damper which is installed on an air supply pipe positioned on an entrance of the indirect evaporative cooler, such that air can be transferred to the indirect evaporative cooler according to whether the third damper is opened or closed,
 a fourth damper which is installed on an air supply pipe positioned on an entrance of the direct evaporative cooler, such that air can be transferred to the direct evaporative cooler according to whether the fourth damper is opened or closed,
 a fifth damper which is installed on an air supply pipe, between the second damper and the fourth damper, such that air can be transferred from the second damper to the fourth damper according to whether the fifth damper is opened or closed,
 a sixth damper which is installed on an air supply pipe, between the fifth damper and the air conditioning space, such that air can be transferred from the fifth damper to the air conditioning space according to whether the sixth damper is opened or closed, and
 a seventh damper which is installed on an exhaust pipe, between the air conditioning space and the first outlet, such that air can be transferred from the air supply space to the first outlet according to whether the seventh damper is opened or closed.

4. The dehumidification•evaporation cooling-based all-fresh-air air conditioning system according to claim 3,
 wherein, when the first temperature is lower than the third temperature, the controller controls the plurality of dampers such that the external air passes through only the indirect evaporative cooler,
 and controls the plurality of dampers to close the first damper, open the second damper, open the third damper, close the fourth damper, close the fifth damper, open the sixth damper, and open the seventh damper.

5. The dehumidification•evaporation cooling-based all-fresh-air air conditioning system according to claim 3,
 wherein, when the first temperature is higher than the third temperature and the first enthalpy is smaller than the third enthalpy, the controller controls the plurality of dampers such that the external air passes through only the direct evaporative cooler, and
 controls the plurality of dampers to close the first damper, open the second damper, close the third damper, open the fourth unit, open the fifth damper, close the sixth damper, and close the seventh damper.

6. The dehumidification•evaporation cooling-based all-fresh-air air conditioning system according to claim 3,
 wherein, when the first temperature is higher than the third temperature, the first enthalpy is greater than the third enthalpy, and the first humidity is smaller than the second humidity, the controller controls the plurality of dampers such that the external air passes through only the indirect evaporative cooler and the direct evaporative cooler, and
 controls the plurality of dampers to close the first damper, open the second damper, open the third damper, open the fourth unit, close the fifth damper, close the sixth damper, and open the seventh damper.

7. The dehumidification•evaporation cooling-based all-fresh-air air conditioning system according to claim 3,
 wherein, when the first temperature is higher than the third temperature, the first enthalpy is greater than the third enthalpy and the first humidity is greater than the second humidity, the controller controls the plurality of dampers such that the external air passes through the humidity controller, the indirect evaporative cooler and the direct evaporative cooler, and
 controls the plurality of dampers to open the first damper, close the second damper, open the third damper, open the fourth unit, close the fifth damper, close the sixth damper, open the seventh damper.

8. The dehumidification•evaporation cooling-based all-fresh-air air conditioning system according to claim 2, wherein
the second information corresponds to a point on a saturation curve of a psychrometric chart(1 atm),
the first information corresponds to a point on the psychrometric chart(1 atm),
the humidity controller changes the first humidity to a fourth humidity,
the indirect evaporative cooler changes the first temperature to a fourth temperature, and
the direct evaporative cooler changes the fourth humidity to the second humidity, and changes the fourth temperature to the second temperature.

9. The dehumidification•evaporation cooling-based all-fresh-air air conditioning system according to claim 1, wherein the humidity controller comprises:
a liquid type dehumidifier; and
a high temperature heater configured to provide high temperature heat source to the liquid type dehumidifier to recycle a dehumidifying agent used in the liquid type dehumidification, and
wherein the high temperature heater comprises:
a solar light heat collector;
a circulation unit which circulate raised temperature hot water which is heat exchanged in the solar light heat collector to the liquid type dehumidifier; and
a heat storage unit which store collected heat from the solar light heat collector unit, composed on the circulation unit.

10. The dehumidification•evaporation cooling-based all-fresh-air air conditioning system according to claim 9, wherein
the liquid type dehumidifier comprises:
a first liquid type dehumidifier and a second liquid type dehumidifier;
the first liquid type dehumidifier makes the first humidity to a fifth humidity; and
the second liquid type dehumidifier makes the fifth humidity to a sixth humidity;
the plurality of pipes comprise an air supply pipe,
the plurality of dampers comprises
an eighth damper which is installed on the air supply pipe, between the first liquid type dehumidifier and the second liquid type dehumidifier, such that air can be transferred from the first liquid type dehumidifier to the second liquid type dehumidifier according to whether the eighth damper is opened or closed,
wherein the controller controls the plurality of dampers to close the eighth damper, when the fifth humidity is smaller than the sixth humidity or equal to the sixth humidity, and
wherein the controller controls the plurality of dampers to open the eighth damper, when the fifth humidity is greater than the sixth humidity.

11. The dehumidification•evaporation cooling-based all-fresh-air air conditioning system according to claim 10,
wherein the temperature controller comprises:
an indirect evaporative cooler configured to cool supplied air by a sensible cooling method; and
a direct evaporative cooler configured to cool and humidify supplied air, and
wherein the direct evaporative cooler is configured to make the sixth humidity to become the second humidity.

12. The dehumidification•evaporation cooling-based all-fresh-air air conditioning system according to claim 10,
wherein the controller controls the plurality of dampers to provide to the plurality of pipes for detouring the first liquid type dehumidifier and the second liquid type dehumidifier, when the first humidity is smaller than the sixth humidity or equal to the sixth humidity.

13. A dehumidification•evaporation cooling-based all-fresh-air air conditioning system control method for controlling a dehumidification•evaporation cooling-based all-fresh-air air conditioning system which includes a plurality of pipes configured to provide a transfer path of the external air, the first air and the second air, a humidity controller located on the plurality of pipes and configured to controls the humidity of the external air, a temperature controller comprised of an indirect evaporative cooler configured to cool supplied air by a sensible cooling method, a direct evaporative cooler configured to cool and humidify supplied air, the temperature controller located on the plurality of pipes and configured to control temperature, humidity and enthalpy of supplied air to be the first air, a plurality of dampers located on the plurality of pipes and configured to change the transfer path of the external air, the first air and the second air, and a controller which decides the transfer path of the air from the external air inlet to the air conditioning space or from the air conditioning space to the outlet, and controls the plurality of dampers for transferring air to the decided transfer path based on first information related to a humidity, a temperature and an enthalpy of the external air,
wherein the dehumidification•evaporation cooling-based all-fresh-air air conditioning system changes a humidity, temperature and enthalpy of an external air which is provided from an external air inlet, to provide a changed first air to an air conditioning space or discharge second air stayed in the air conditioning space from the air conditioning space to an outlet,
the dehumidification•evaporation-based all-fresh-air air conditioning system control method comprising:
a first step of comparing the first information which includes a first temperature, a first humidity and a first enthalpy of the external air, and second information which includes a second humidity, a second temperature and a second enthalpy of the first air, and obtaining third information including a third temperature, a third humidity and a third enthalpy,
wherein the controller sets the third temperature equal to the second temperature when the first temperature is higher than the second temperature, and wherein the controller sets the third temperature higher than the second temperature, when the second temperature is higher than the first temperature, and
wherein the path control reference enthalpy is obtained from the path control reference temperature and a predetermined relative humidity;
a second step of comparing the first temperature and the third temperature;
a third step of comparing the first enthalpy and the third enthalpy, when decided the first temperature is greater than the third temperature as a result of the second step; and
a fourth step of comparing the first humidity and the second humidity, when the first enthalpy is greater than the third enthalpy, as a result of the third step.

14. The dehumidification•evaporation cooling-based all-fresh-air air conditioning system control method according to claim 13, wherein, when it is determined by the second step that the first temperature is smaller than the third temperature, the external air is provided to the air conditioning space such that the external air only passes through the indirect evaporative cooler, when the first temperature is smaller than the third temperature, as a result of the second step.

15. The dehumidification•evaporation cooling-based all-fresh-air air conditioning system control method according to claim 13,
   wherein the external air is provided to the air conditioning space such that the external air only passes through the direct evaporative cooler, when the first enthalpy is smaller than the third enthalpy, as a result of the third step.

16. The dehumidification•evaporation cooling-based all-fresh-air air conditioning system control method according to claim 13,
   wherein the external air is provided to the air conditioning space such that the external air only passes through the indirect evaporative unit and the direct evaporative cooler, when the first humidity is smaller than the second humidity, as a result of the fourth step.

17. The dehumidification•evaporation cooling-based all-fresh-air air conditioning system control method according to claim 13,
   wherein the external air is provided to the air conditioning space such that the external air passes through the humidity controller, the indirect evaporative unit and the direct evaporative cooler, when the first humidity is greater than the second humidity, as a result of the fourth step.

\* \* \* \* \*